June 29, 1926.
H. E. SIMI
1,590,326
BRAKE VALVE DEVICE
Filed June 12, 1924
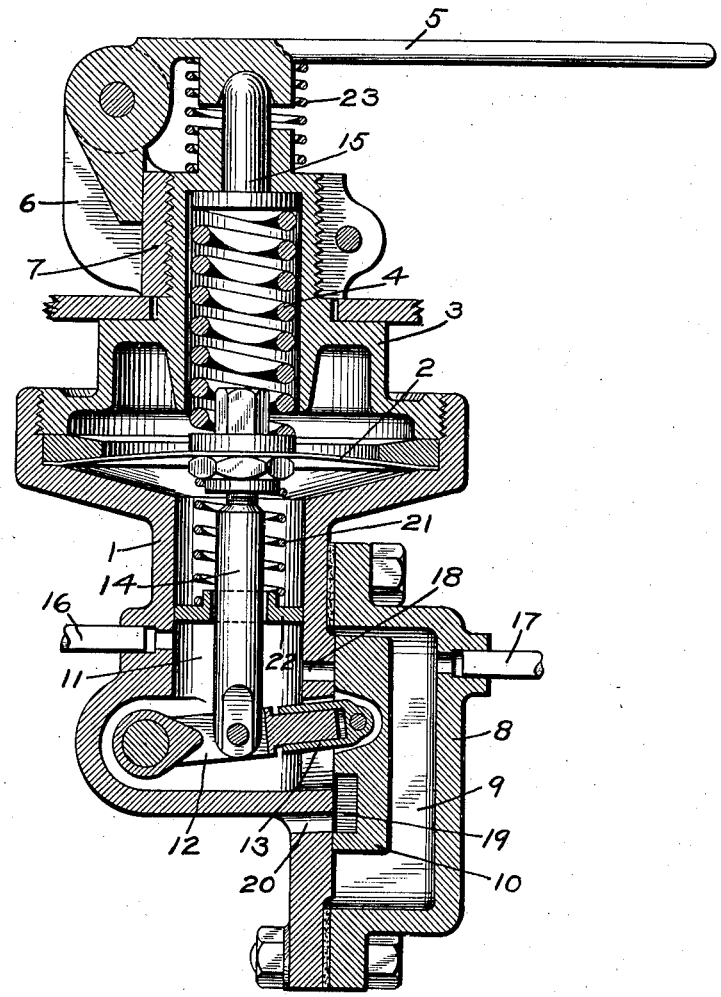
INVENTOR
HENDRICK E. SIMI
BY Wm. M. Cady
ATTORNEY Patented June 29, 1926.

1,590,326

UNITED STATES PATENT OFFICE.

HENDRICK E. SIMI, OF OAKLAND, CALIFORNIA, ASSIGNOR TO THE WESTINGHOUSE AIR BRAKE COMPANY, OF WILMERDING, PENNSYLVANIA, A CORPORATION OF PENNSYLVANIA.

BRAKE-VALVE DEVICE.

Application filed June 12, 1924. Serial No. 719,542.

This invention relates to brake valve devices, and more particularly to a brake valve device adapted for automotive brakes.

The principal object of my invention is to provide an improved brake valve device of the above type.

In the accompanying drawing, the single figure is a vertical section of a brake valve device embodying my invention.

As shown in the drawing, the construction may comprise a casing 1 having a chamber containing a flexible diaphragm 2. The diaphragm chamber at one side of the diaphragm is closed by a cover casing section 3 having screw-threaded engagement with the casing 1 and contained in the chamber of said section is a coil spring 4 which acts on diaphragm 2. A spring follower 15 engages the outer end of the spring and extends out of the casing section 3, so as to be engaged by a manually operable lever 5. Said lever is pivotally mounted on a lug 6, carried by a sleeve 7, having screw-threaded engagement with the section 3.

A valve casing 8 is secured to casing 1 and has a valve chamber 9 containing a slide valve 10. Pivotally mounted within diaphragm chamber 11 of casing 1 is a rocker arm 12, the free end of which has sliding engagement in a sleeve 13, which is pivotally connected to the valve 10. Pivotally connected to the arm 12 is a rod 14, which is secured to diaphragm 2, so that movement of diaphragm 2 moves the arm 12 and thereby the valve 10.

A brake chamber (not shown) is connected by pipe 16 to chamber 11 and a source of fluid under pressure is connected by pipe 17 to valve chamber 9.

In operation, if it is desired to apply the brakes, the lever 5 is depressed, so as to compress the spring 4 a certain amount and the diaphragm 2 is then moved downwardly by the pressure of the spring. The valve 10 is thus shifted by the operation of the arm 12 so as to uncover a port 18, through which fluid under pressure is supplied from valve chamber 9 to diaphragm chamber 11 and thence through pipe 16 to the brake chamber, so as to effect an application of the brakes.

The pressure of fluid supplied to the brake chamber acts in diaphragm chamber 11 on the diaphragm 2 and when the pressure of fluid slightly exceeds the force of spring 4, the diaphragm 2 will be moved upwardly. The arm 12 is thereby operated to shift the valve 10 so as to close the port 18 and cut off the further supply of fluid to the brake chamber.

To release the brakes, the lever 5 is relieved of pressure, so that spring 4 is freed of pressure and diaphragm 2 is then operated by the pressure in chamber 11 to shift the valve 10 to release position, as shown in the drawing, in which a cavity 19 connects chamber 11 and the brake chamber to an atmospheric exhaust port 20. The release movement is assisted by spring 21 interposed between the diaphragm 2 and a fixed abutment 22. The release movement of lever 5 is assisted by spring 23.

Having now described my invention, what I claim as new and desire to secure by Letters Patent, is:—

1. A brake valve device comprising a casing, a flexible diaphragm mounted in said casing, a spring acting on said diaphragm, means for varying the pressure on said spring, a slide valve for controlling the fluid pressure for operating the brakes, a stem connected to said diaphragm, a rocker arm pivotally connected to said stem, and a sleeve in sliding engagement with one end of said arm and pivotally connected to said valve.

2. A brake valve device comprising a casing, a flexible diaphragm mounted in said casing, a spring acting on said diaphragm, a slide valve for controlling the fluid pressure for operating the brakes, a stem connected to said diaphragm, a rocker arm pivoted to said casing and operatively connected to said valve, said arm being pivotally connected to said stem at a point intermediate the casing and the valve connection.

In testimony whereof I have hereunto set my hand.

HENDRICK E. SIMI.